(12) United States Patent
Ripley

(10) Patent No.: US 9,446,810 B2
(45) Date of Patent: Sep. 20, 2016

(54) SNOWMOBILE

(75) Inventor: Anthony Ripley, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 776 days.

(21) Appl. No.: 13/021,586

(22) Filed: Feb. 4, 2011

(65) Prior Publication Data

US 2011/0192667 A1    Aug. 11, 2011

Related U.S. Application Data

(60) Provisional application No. 61/302,394, filed on Feb. 8, 2010, provisional application No. 61/337,676, filed on Feb. 9, 2010.

(51) Int. Cl.
*B62M 27/00* (2006.01)
*B62J 25/00* (2006.01)
*B62M 27/02* (2006.01)

(52) U.S. Cl.
CPC ............... *B62J 25/00* (2013.01); *B62M 27/02* (2013.01); *Y10T 403/70* (2015.01)

(58) Field of Classification Search
CPC ............... B62M 27/00; B62M 27/02; B62M 2027/028; B62M 29/00
USPC ...... 180/182, 190, 186; 280/781, 785, 281.1
See application file for complete search history.

(56) References Cited

U.S. PATENT DOCUMENTS

| | | |
|---|---|---|
| 1,315,360 A | 9/1919 | Blystad |
| 1,650,334 A | 11/1927 | Eliason |
| 3,575,474 A | 4/1971 | Russ, Sr. |
| 3,722,961 A | 3/1973 | Haley et al. |
| 3,732,939 A | 5/1973 | Samson |
| 3,781,067 A | 12/1973 | Dodson et al. |
| 3,835,948 A | 9/1974 | Duclo |
| 3,840,082 A | 10/1974 | Olson |
| 3,840,083 A | 10/1974 | Woods |
| 3,901,335 A | 8/1975 | Johnson |
| 3,966,004 A | 6/1976 | Rose |
| 4,146,101 A | 3/1979 | Plourde |
| 4,491,333 A | 1/1985 | Warnke |
| 5,129,473 A | 7/1992 | Boyer |
| 5,474,146 A | 12/1995 | Yoshioka et al. |
| 5,533,585 A | 7/1996 | Kawano et al. |
| 5,568,840 A | 10/1996 | Nagata et al. |
| 5,685,387 A | 11/1997 | Rioux et al. |
| 5,700,020 A | 12/1997 | Noble |

(Continued)

FOREIGN PATENT DOCUMENTS

| | | |
|---|---|---|
| CA | 2109241 A1 | 2/1995 |
| CA | 2244520 A1 | 1/2000 |

(Continued)

OTHER PUBLICATIONS

European Patent Office, International Search Report for PCT/US2010/003207, May 6, 2011, 8 pages.

(Continued)

*Primary Examiner* — Anne Marie Boehler
(74) *Attorney, Agent, or Firm* — Faegre Baker Daniels LLP

(57) ABSTRACT

The present invention generally relates to snowmobiles. More particularly, the present invention relates to the components of a snowmobile such as the frame, running boards and various other assemblies.

12 Claims, 22 Drawing Sheets

(56) References Cited

U.S. PATENT DOCUMENTS

| | | |
|---|---|---|
| 5,881,834 A | 3/1999 | Karpik |
| 5,957,230 A | 9/1999 | Harano et al. |
| 5,996,717 A * | 12/1999 | Hisadomi ............... 180/182 |
| 6,012,728 A | 1/2000 | Noble |
| 6,109,217 A | 8/2000 | Hedlund et al. |
| 6,331,008 B2 | 12/2001 | Cormican |
| 6,431,561 B1 | 8/2002 | Hedlund |
| 6,446,744 B2 | 9/2002 | Wubbolts et al. |
| 6,604,594 B2 | 8/2003 | Wubbolts et al. |
| 6,626,444 B2 | 9/2003 | Noble |
| 6,681,724 B1 | 1/2004 | Berg |
| 6,708,791 B2 | 3/2004 | Alexander |
| 6,755,271 B1 | 6/2004 | Berg |
| 6,758,497 B2 * | 7/2004 | Bergman ............... 280/833 |
| 6,772,852 B2 | 8/2004 | Morin et al. |
| 6,863,142 B2 | 3/2005 | Corbeil |
| 6,892,844 B2 | 5/2005 | Atsuumi |
| 6,973,988 B2 | 12/2005 | Morin et al. |
| RE39,012 E | 3/2006 | Noble |
| 7,040,438 B2 | 5/2006 | Yoshihara |
| 7,048,293 B2 | 5/2006 | Bedard |
| 7,055,454 B1 | 6/2006 | Whiting et al. |
| 7,080,706 B2 | 7/2006 | Vaisanen |
| 7,124,848 B2 | 10/2006 | Girouard et al. |
| 7,150,336 B2 | 12/2006 | Desmarais |
| 7,188,693 B2 | 3/2007 | Girouard et al. |
| 7,204,331 B2 | 4/2007 | Yatagai et al. |
| 7,232,134 B2 | 6/2007 | Ruzewski et al. |
| 7,252,301 B2 | 8/2007 | Valikangas |
| 7,316,284 B2 | 1/2008 | Lefort |
| 7,322,435 B2 | 1/2008 | Lillbacka et al. |
| 7,328,765 B2 | 2/2008 | Ebert et al. |
| 7,353,898 B1 | 4/2008 | Bates, Jr. |
| 7,357,201 B2 | 4/2008 | Jordan |
| 7,377,348 B2 | 5/2008 | Girouard et al. |
| 7,413,046 B2 | 8/2008 | Okada et al. |
| 7,487,975 B2 | 2/2009 | Pryputniewicz |
| 7,503,568 B2 | 3/2009 | Mehrmann |
| 7,533,749 B1 | 5/2009 | Sampson et al. |
| 7,617,900 B2 * | 11/2009 | Olson ............... 180/190 |
| 7,775,313 B1 | 8/2010 | Sampson |
| 7,802,644 B2 | 9/2010 | Brodeur et al. |
| 7,870,920 B1 | 1/2011 | Dalgren |
| 7,997,372 B2 * | 8/2011 | Maltais ............... 180/190 |
| 8,122,993 B2 * | 2/2012 | Ripley et al. ............... 180/233 |
| 2002/0129984 A1 | 9/2002 | Wubbolts et al. |
| 2003/0137117 A1 | 7/2003 | Lund et al. |
| 2004/0104062 A1 | 6/2004 | Bedard et al. |
| 2004/0173390 A1 | 9/2004 | Karpik |
| 2005/0034909 A1 | 2/2005 | Vaisanen |
| 2005/0039961 A1 * | 2/2005 | Moriyama ............... 180/190 |
| 2005/0039962 A1 | 2/2005 | Bedard |
| 2005/0126839 A1 | 6/2005 | Rasidescu et al. |
| 2006/0061051 A1 | 3/2006 | Lemieux |
| 2006/0162976 A1 * | 7/2006 | Desmarais ............... 180/190 |
| 2007/0284171 A1 | 12/2007 | Okada |
| 2009/0071738 A1 | 3/2009 | Bennett |
| 2010/0089355 A1 | 4/2010 | Fredrickson et al. |

FOREIGN PATENT DOCUMENTS

| | | |
|---|---|---|
| CA | 2451017 | 5/2004 |
| FR | 2662610 A1 | 12/1991 |
| WO | WO 2008/060265 | 5/2008 |
| WO | WO 2009/114414 | 9/2009 |

OTHER PUBLICATIONS

European Patent Office, Written Opinion for PCT/US2010/003207, May 6, 2011, 12 pages.

* cited by examiner

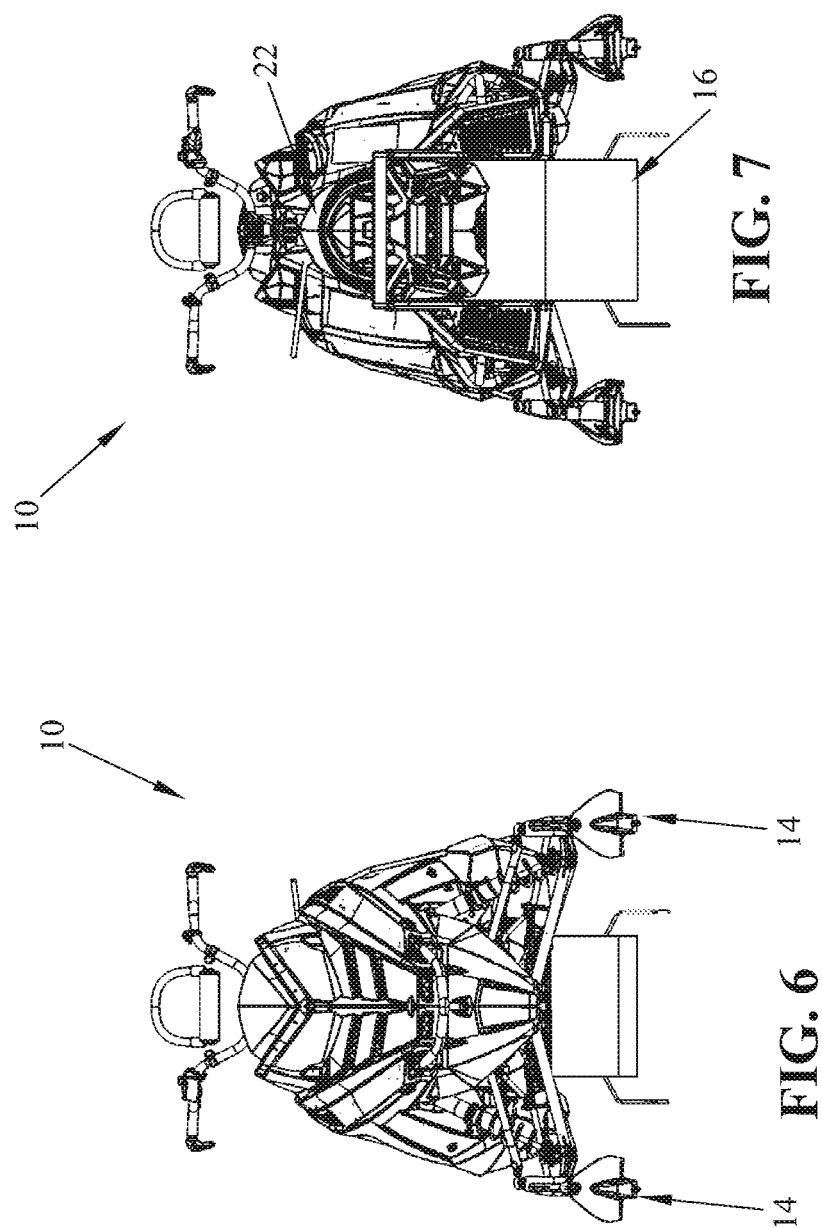

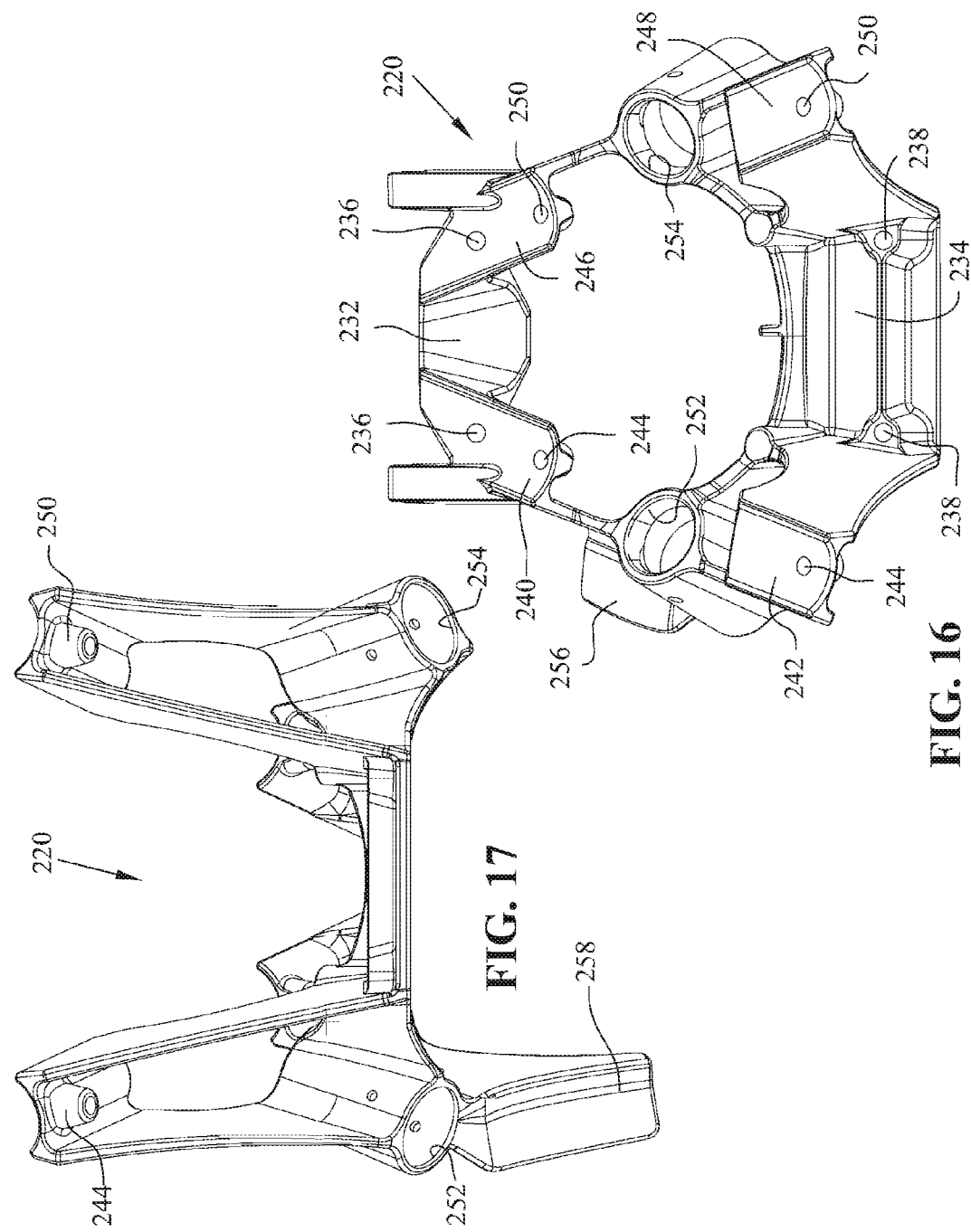

_US 9,446,810 B2_

SNOWMOBILE

This application claims the benefit of U.S. Provisional Patent Application Ser. No. 61/302,394, filed on Feb. 8, 2010, and U.S. Provisional Patent Application Ser. No. 61/337,676, filed on Feb. 9, 2010, the complete disclosures of which are expressly incorporated by reference herein.

BACKGROUND

The present invention generally relates to snowmobiles. More particularly, the present invention relates to the components of a snowmobile such as the frame, suspension, running boards and various other assemblies.

Generally, there are a variety of configurations of snowmobiles available for applications such as deep snow, high performance, luxury touring, trail riding, etc. Most snowmobiles include a frame, a power train, a pair of front skis, and an endless belt assembly. Typically, features such as engine displacement and track length vary depending upon the specific application for which the snowmobile is targeted. For example, snowmobiles designed primarily for deep snow application may include an endless belt assembly having a longer track length, i.e. 166 inches (4.2 meters), than a snowmobile designed primarily for trail riding, i.e. 135 inches (3.4 meters). A snowmobile designed for deep snow may also include a relatively large displacement engine, i.e. 900 $cc^3$ (54.9 $inches^3$), to provide suitable power when operating in a mountain environment at higher elevations with less oxygen. Other features of a deep snow snowmobile may be added to improve ride and handling characteristics such as side hilling.

A deep snow snowmobile is shown in our patent application Ser. No. 11/501,454 filed Aug. 9, 2006, the contents of which are incorporated herein by reference.

SUMMARY

One illustrative embodiment of the present invention includes a snowmobile comprising a frame, a power train supported by the frame; a running board assembly supported by the frame and comprising a toe clip, a front wall and a foot tread; and a shroud laterally encompassing the toe clip and the back wall, with the toe clip extending rearwardly, beyond a rear edge of the shroud.

Another illustrative embodiment of the present invention includes a frame; a power train supported by the frame; a running board assembly supported by the frame and comprising a toe clip, a front wall and a foot tread; and a shroud laterally encompassing the toe clip and the back wall, with the back wall extending substantially aligned with a rear edge of the shroud.

Another illustrative embodiment of the present invention includes a snowmobile comprising: a frame; a power train supported by the frame; and a running board assembly supported by the frame and comprising a toe clip, a front wall and a foot tread; the foot tread having upturned embossed openings having gripping surfaces thereon.

Another illustrative embodiment of the present invention includes a snowmobile comprising a frame; a power train supported by the frame; and a running board assembly supported by the frame and comprising a toe clip, a front wall and a foot tread; the foot tread having upturned embossed openings and openings through the running board.

Another illustrative embodiment of the present invention includes a snowmobile comprising a frame; a power train supported by the frame; a running board assembly supported by the frame and comprising a toe clip, a front wall and a foot tread; and a shroud laterally encompassing the toe clip and the back wall, with the back wall extending substantially aligned with a rear edge of the shroud.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 6 is a front view of the embodiment shown in FIG. 1;

FIG. 7 is a rear view of the embodiment shown in FIG. 1;

FIG. 16 is a front perspective of the cast frame member;

FIG. 17 is an underside perspective view of the cast frame member of FIG. 16;

DETAILED DESCRIPTION

Figure 1:
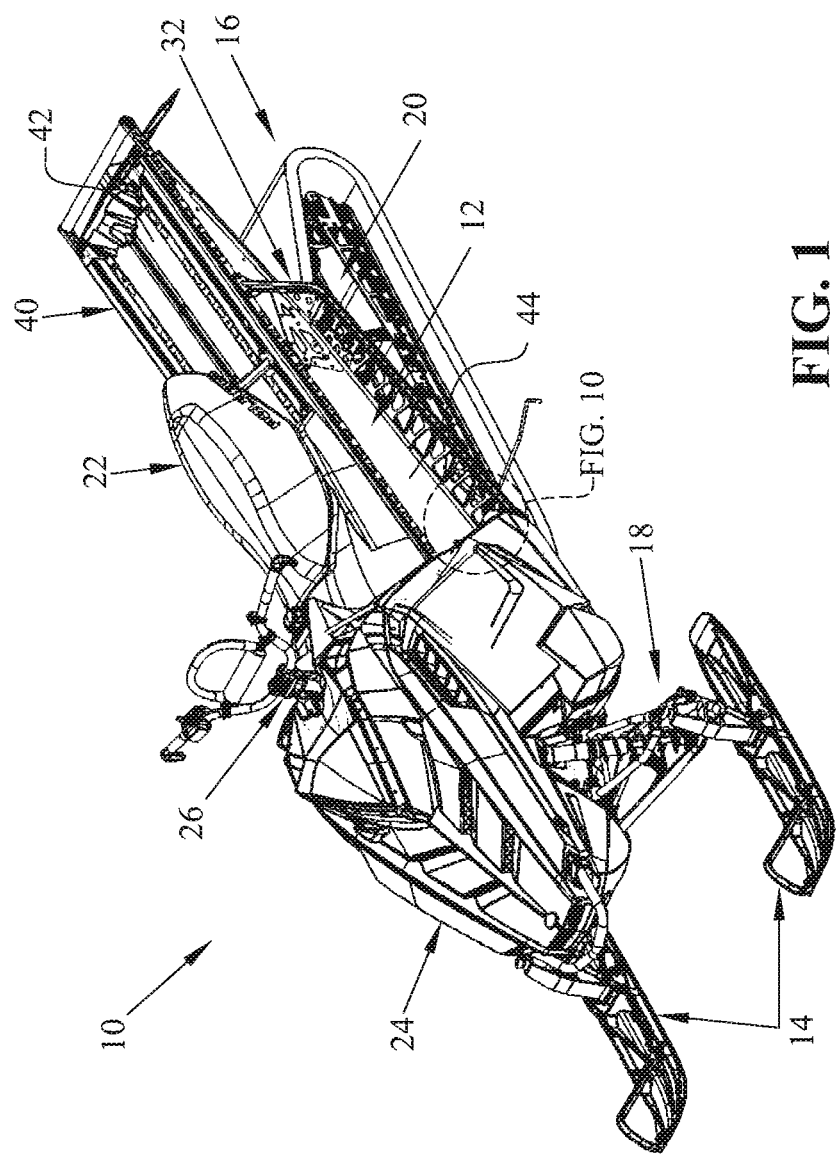
FIG. 1 is a front perspective view of an illustrative embodiment of a snowmobile.

Corresponding reference characters indicate corresponding parts throughout the several views. Although the drawings represent embodiments of the present invention, the drawings are not necessarily to scale and certain features may be exaggerated in order to better illustrate and explain the present invention.

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to a snowmobile, it should be understood that the principles of the invention apply equally to other snow vehicles. While the present invention primarily involves a snowmobile, it should be understood, however, that the invention may have application to other types of vehicles, such as motorcycles, ATVs, utility vehicles, scooters, and mopeds.

Referring to FIGS. 1-8, one illustrative embodiment of a snowmobile 10 is shown. Snowmobile 10 includes a frame 12, supported by front skis 14 and by endless belt assembly 16. Front skis are coupled to a front suspension 18, and endless belt assembly is supported by a rear suspension 20. Snowmobile also includes a seat assembly 22, front outer body 24, and a steering assembly 26. Steering assembly 26 is operably coupled to steering arms 28 (FIG. 2) which allows a rider to steer snowmobile 10. A power train is covered by outer body 24 and provides power to endless belt assembly 16. Running board assemblies 32 extend along the sides of the seat assembly which are supported by the frame 12. A snow flap 34 (FIG. 2) is also supported by the frame rearward of the endless belt.

Figure 2:
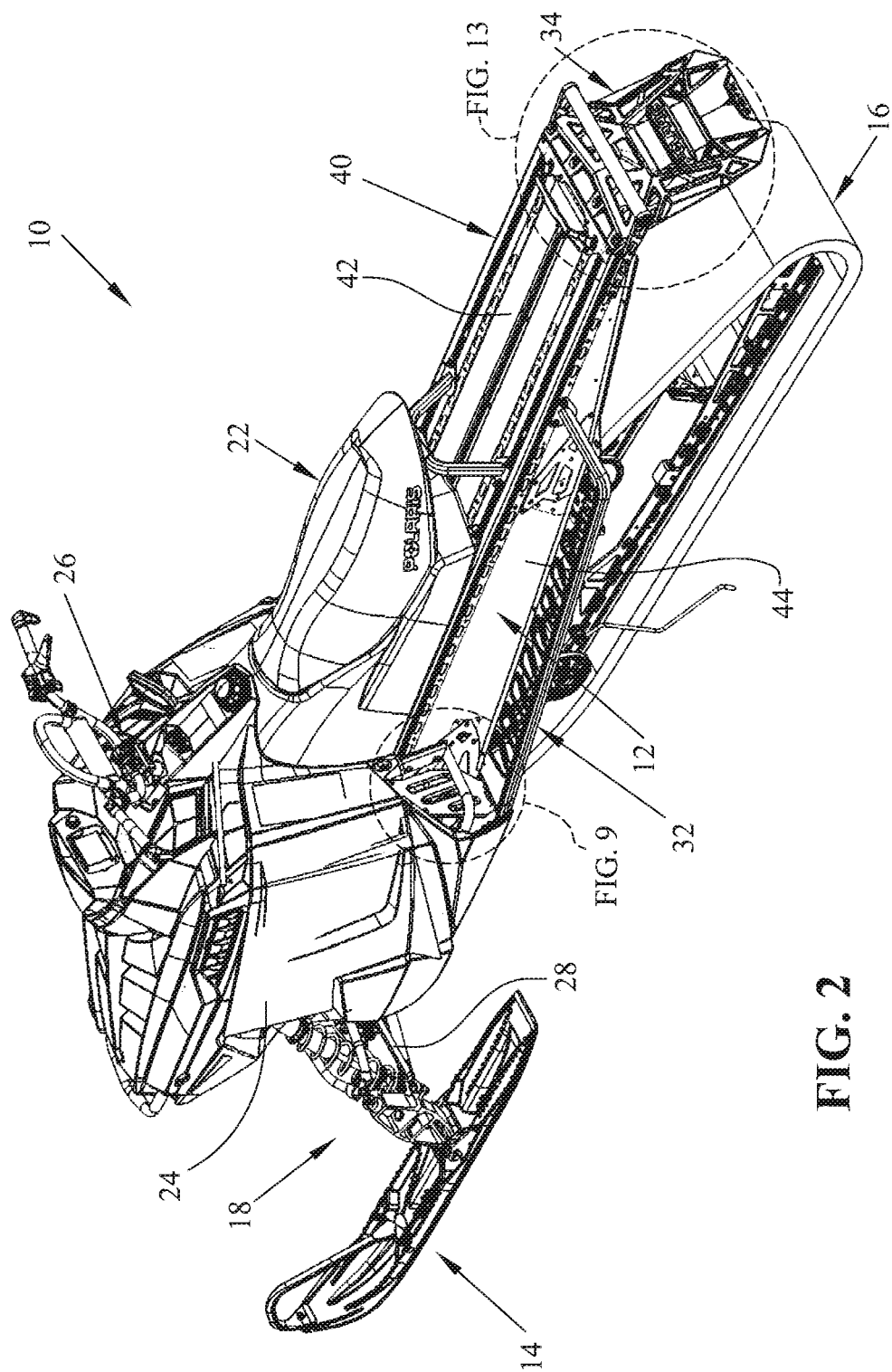
FIG. 2 is a rear perspective view of the embodiment shown in FIG. 1.
Figure 3:
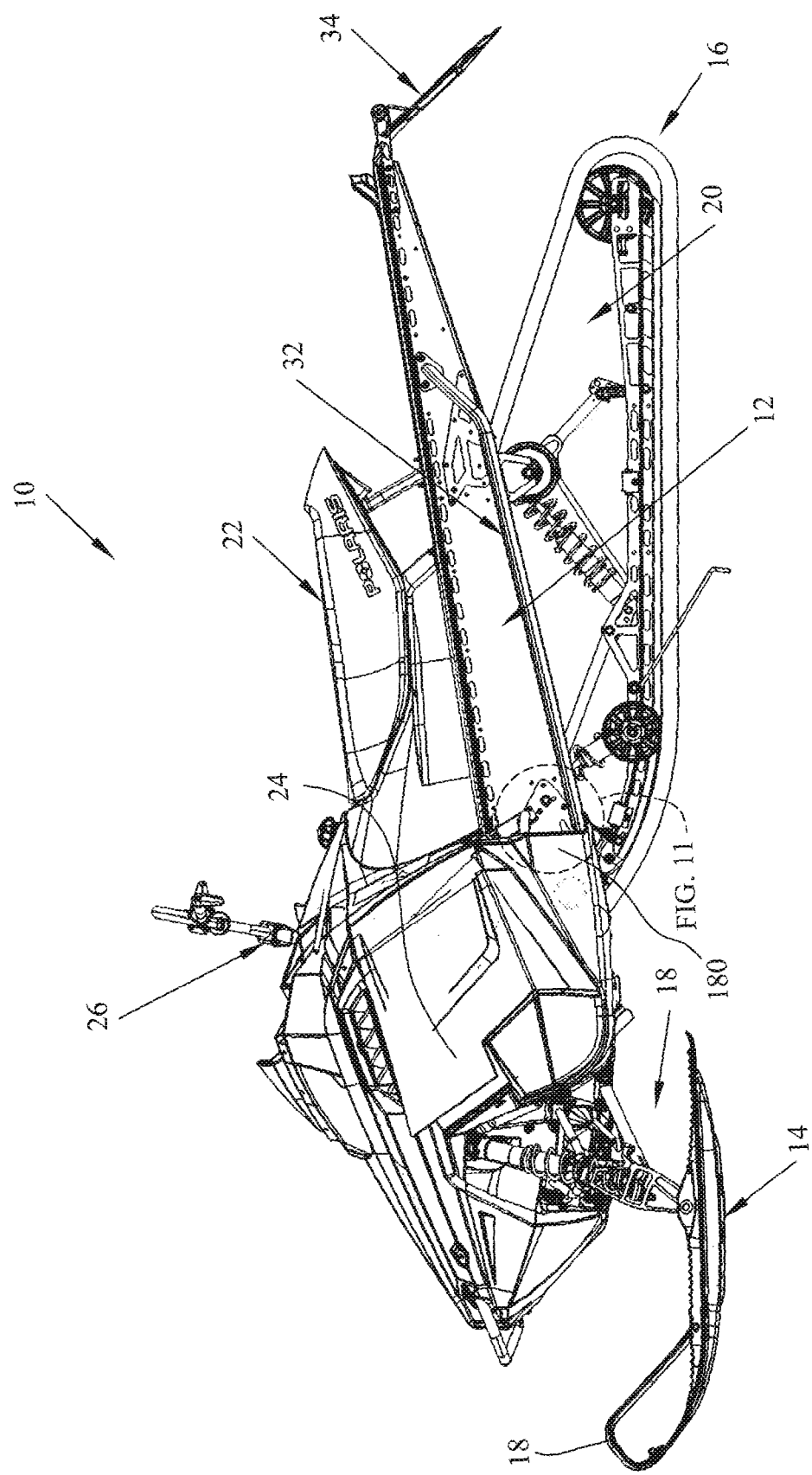
FIG. 3 is a side view of the left hand side of the embodiment shown in FIG. 1.
Figure 4:
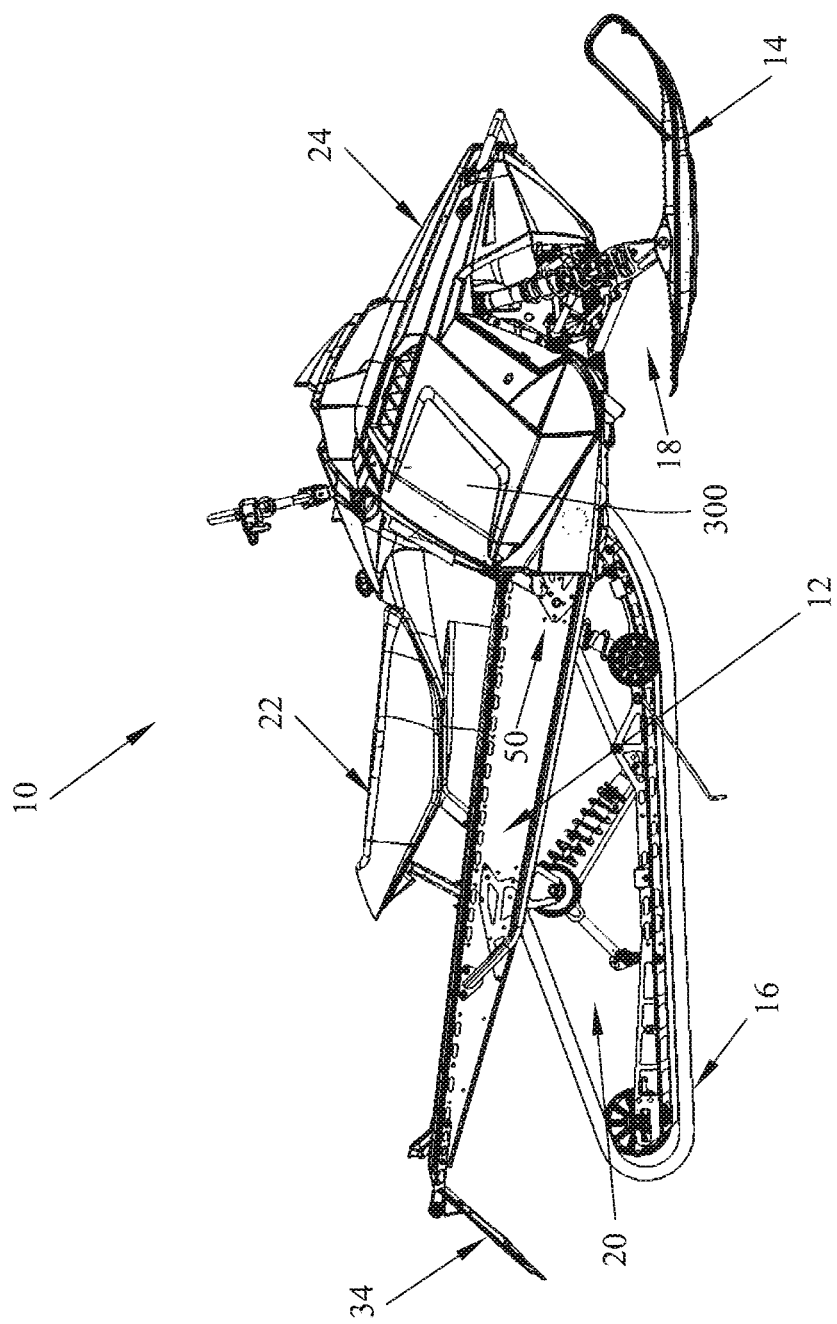
FIG. 4 is a side view of the right side of the embodiment shown in FIG. 1.
Figure 5:
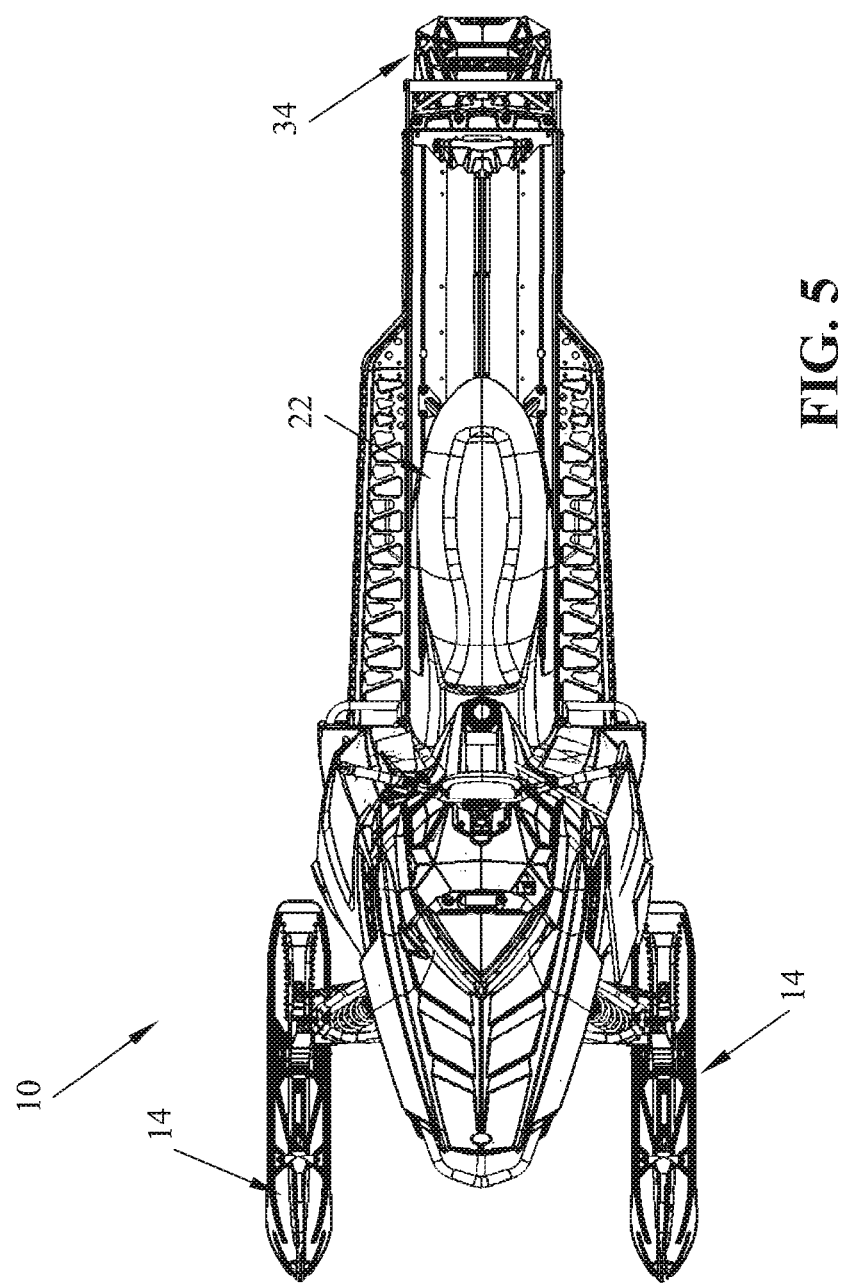
FIG. 5 is a top view of the embodiment shown in FIG. 1.
Figure 8:
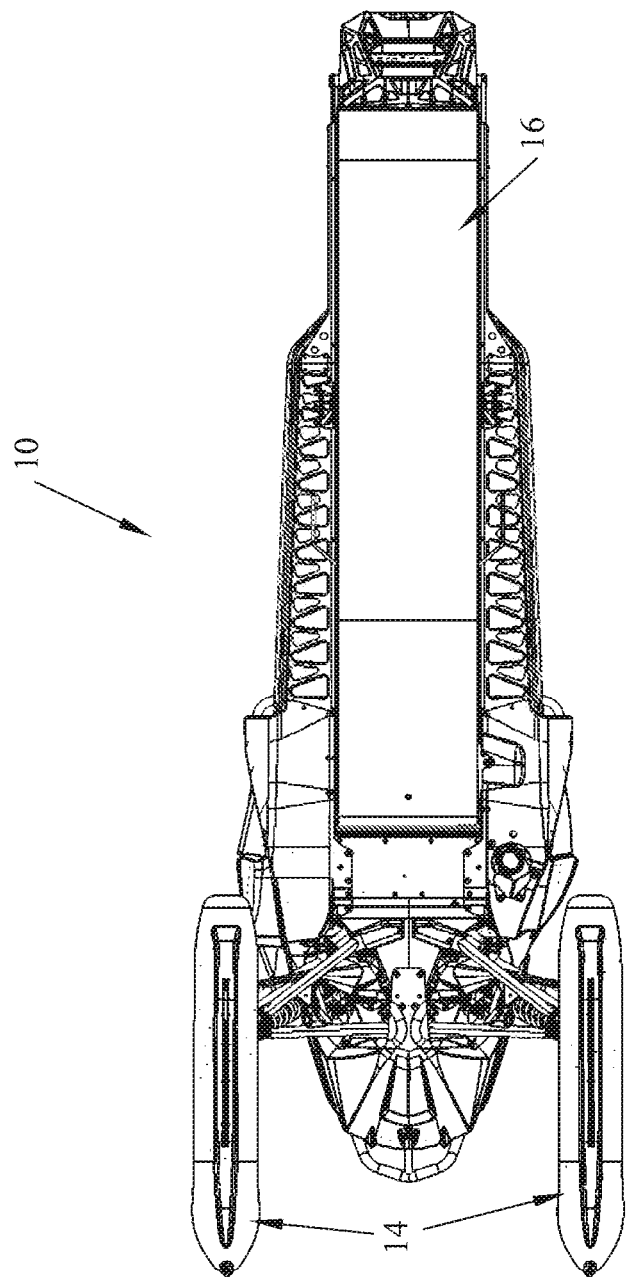
FIG. 8 is a bottom view of the embodiment shown in FIG. 1.

With reference to FIGS. 1 and 2, frame 12 includes a tunnel 40 having a top wall 42 and side walls 44. As shown best in FIG. 2, endless belt 16 at least partially runs up into tunnel 40 between side walls 44 and upwardly towards top wall 42. As shown, running board assemblies 32 include a rider's foot grip assembly 50 (FIG. 4) and a foot tread assembly 52, where the foot grip assembly 50 and foot tread assembly 52 are supported by the tunnel sidewall 44. As shown best in FIGS. 11 and 12, the tunnel 40 also include a plurality of cutout portions 46 which reduce the material in locations where fasteners are not needed. These cutouts 46 help to reduce the weight of the entire vehicle. The surface to which sidewalls 44 abut (not shown), also include notches but complement notches 46 such that the notches do not overlap. Other cutouts could be provided elsewhere as well.

Figure 9:
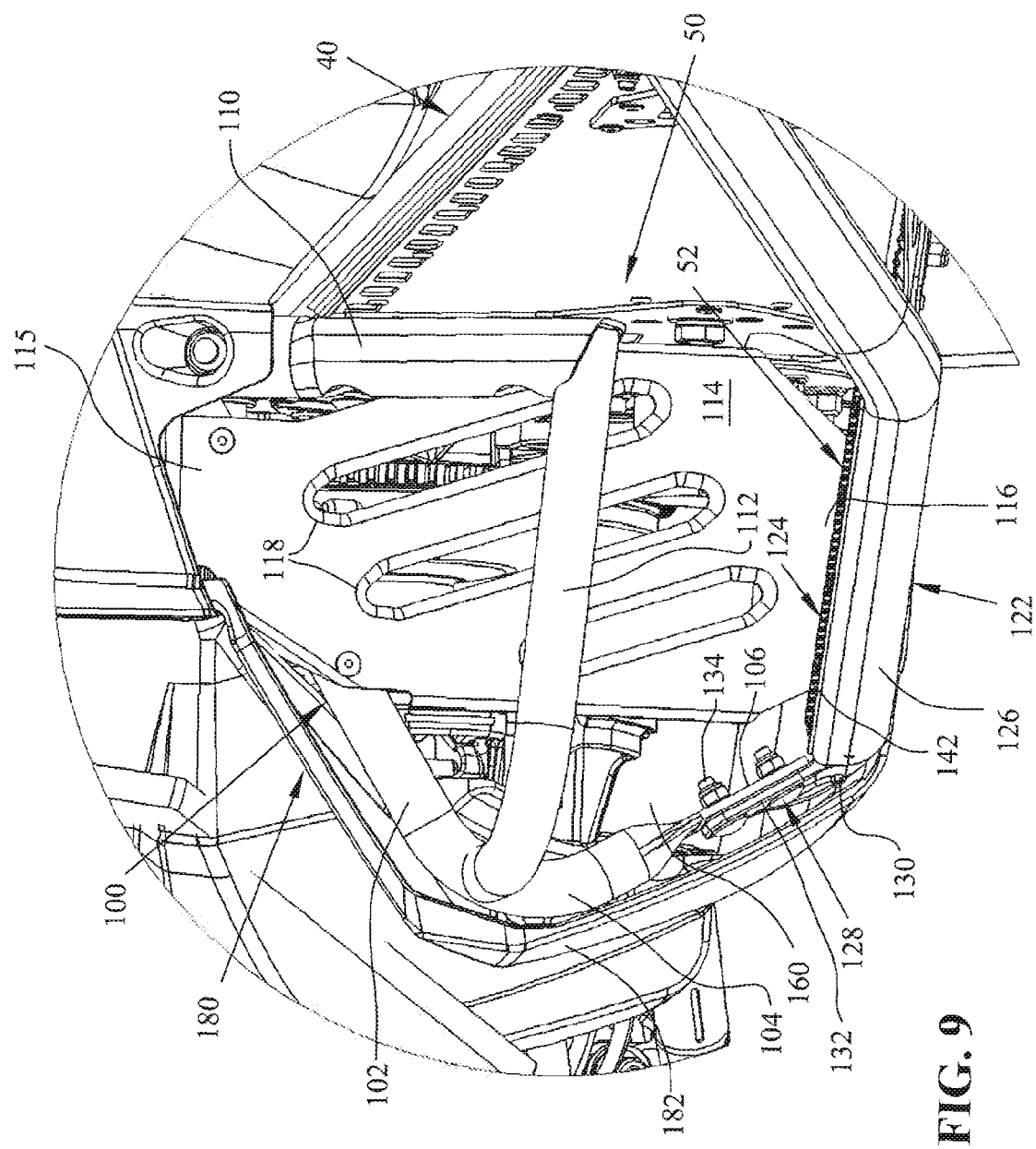
FIG. 9 is an enlarged view of the running board assembly of the embodiment shown in FIG. 1.

With reference now to FIG. 9, the foot grip assembly 50 is shown in greater detail. Foot grip assembly 50 includes frame member 100 which extends over the top wall 42 of tunnel 40, having a first portion 102 extending downwardly and away from the tunnel, and a second portion 104 extending downwardly and reversely bent towards the tunnel. The end of portion 104 is flattened and includes a flange at 106. Foot grip assembly 50 further includes a tube portion 110 which is fastened to the side of the tunnel and connected to frame portion 100 for example, by welding. A toe clip 112 extends between frame member 110 and frame portion 102. Finally, foot grip assembly 50 includes a back wall 114 attached at marginal edges 115 and 116, and comprises plural slotted openings 118.

Figure 10:
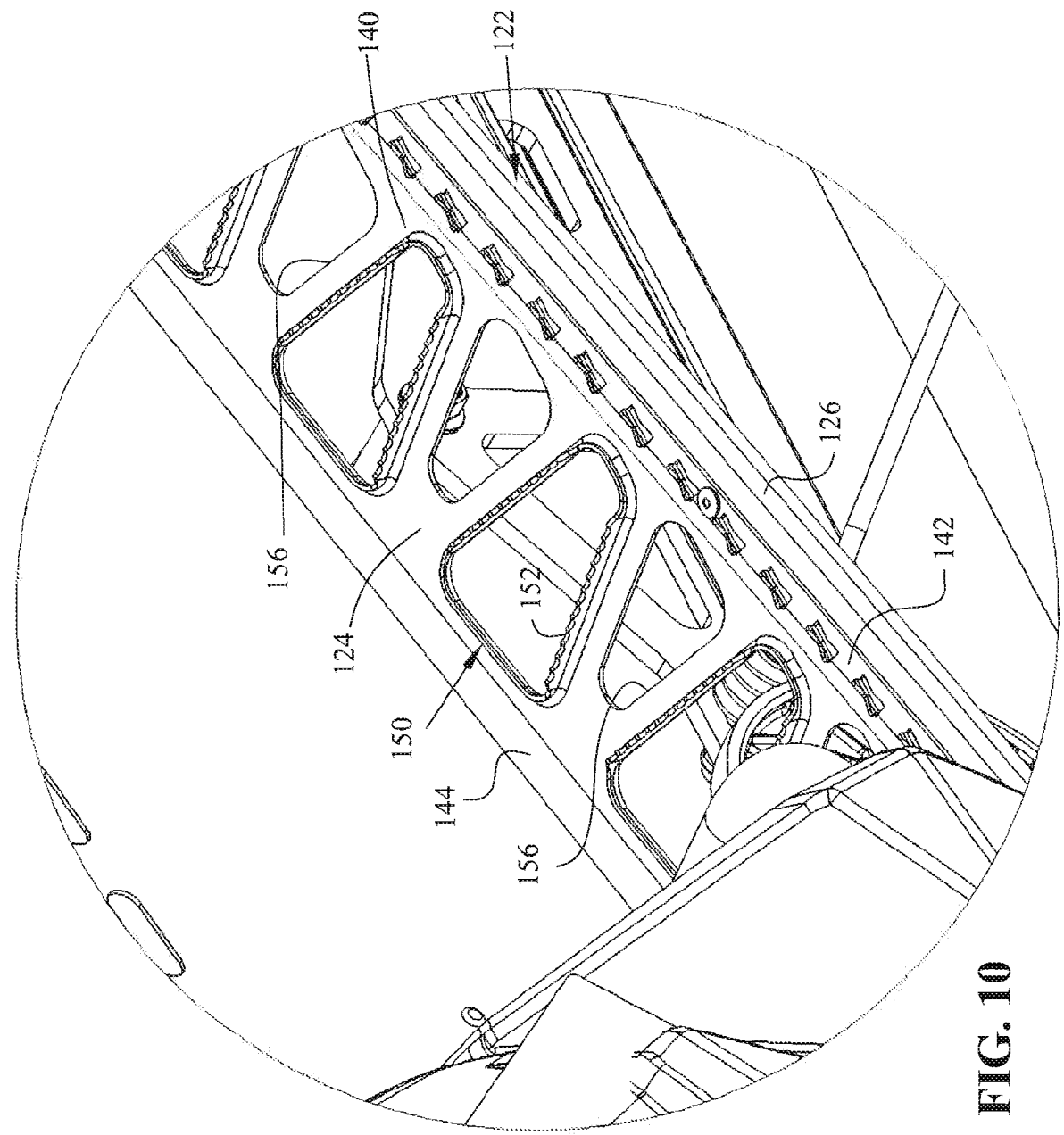
FIG. 10 is an enlarged view of the foot tread of the embodiment shown in FIG. 1.
Figure 11:
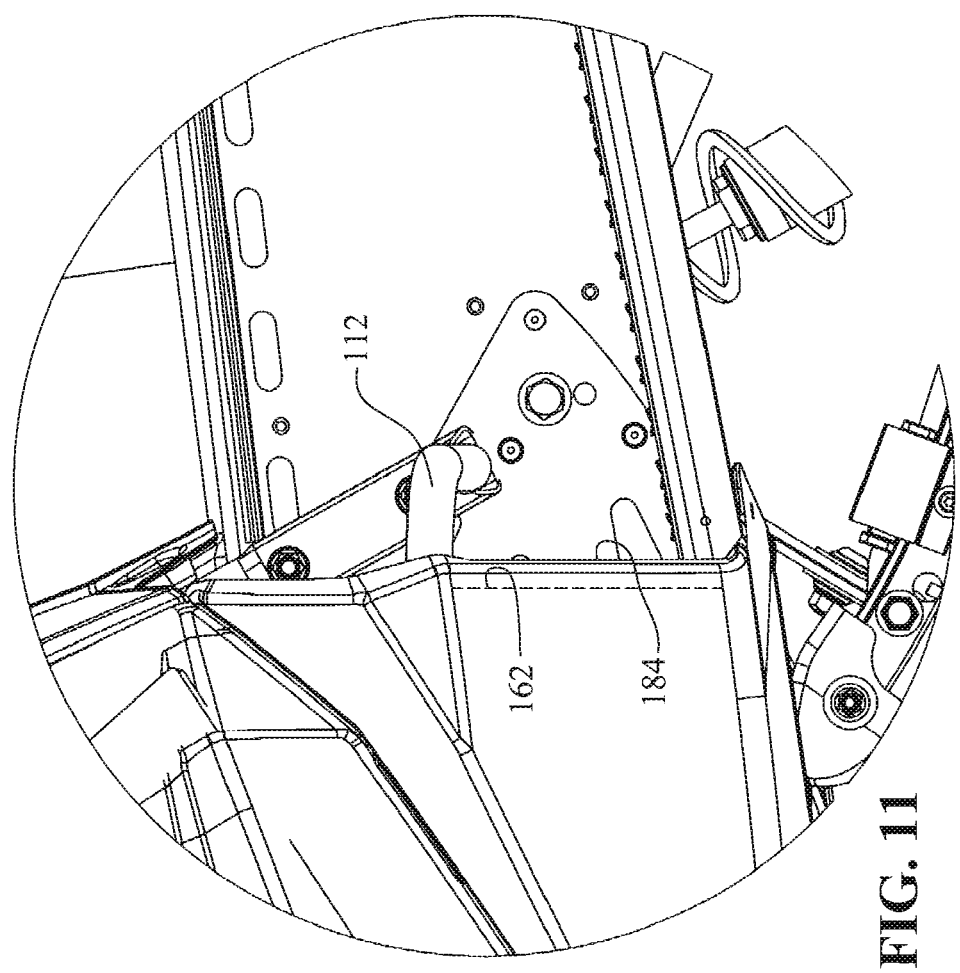
FIG. 11 is an enlarged side view of a front portion of the running board.
Figure 12:
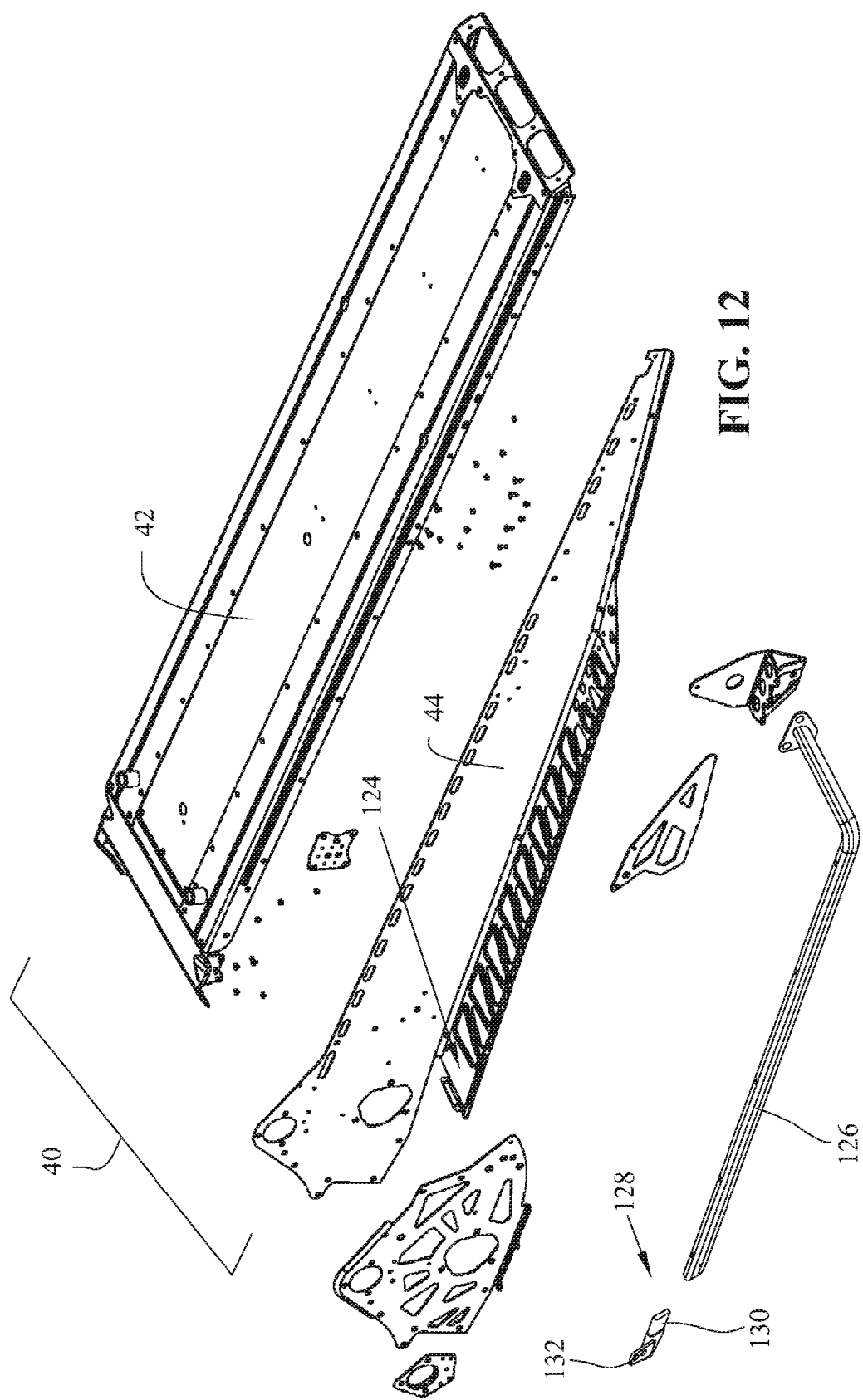
FIG. 12 is an exploded view of the tunnel.

With reference to FIGS. 9-12, foot tread assembly 52 is comprised of an elongate frame member 122 and running board plate 124. Elongate frame member 122 is comprised of a tube 126 and a frame bracket 128. As shown in FIG. 12, frame bracket 128 is discreet from tube 126. Bracket 128 includes a bracket foot 130 which extends into tube 126 and a bracket arm 132 for attachment to flange 106. Bracket foot 130 may be attached to tube 126 by way of fasteners, welding or adhesives, or a combination thereof. As shown (FIG. 9), the flattened surfaces of flanges 106 and bracket arms 132 are positioned back to back and attached by way of fasteners 134 (FIG. 9). Furthermore, the planes of the flat surfaces of flanges 106 and bracket member 132 extend in a longitudinal direction as described herein.

With respect now to FIGS. 9 and 10, running board plate 124 is comprised of a plate portion 140 having a lip 142 positioned and attached to elongate tube member 126 as shown. The opposite side of the plate portion 140 has a marginal edge 144 which is attached to the tunnel side wall 44. As shown in FIG. 12, the running board plate 124 is integral with the tunnel side wall 44, however this connection could also be by fastening, such as by welding, adhesives or riveting.

The running board plate 124 further includes a plurality of upturned embossments 150 (FIG. 10) having a generally triangular shape with gripping serrations 152 positioned thereon. Intermediate each of the upturned embossments 150 is an opening 156, of reverse triangular shape, where the embossments 150 rigidify the plate portion 140 whereas openings 156 maximize the open area of the foot tread to allow snow to drop downwardly therethrough. This provides a smooth bottom surface to plate portion 140, having no interference with the snow.

Thus, as shown in FIG. 9, an enlarged ventilation area is defined by the spacing at 160 and within the slots 118. The longitudinal disposition of the flanges 106 and 132 as described above also maximizes the ventilation area 160, particularly for the removal heat from the engine compartment as described herein.

Finally, with respect to FIGS. 9-11, an outer shroud 180 covers foot grip assembly 50 and includes a shroud portion 182 which encompasses portions 102 and 104 of frame tube 100. Shroud 180 also includes a rear edge 184 (FIG. 11) which is proximate to back wall 162. As shown best in FIG. 11, toe clip 112 extends rearwardly beyond rear edge 184 of shroud 180 which provides easy access for the rider to place their boot in the toe clip, yet prevents forming a pocket into which snow may accumulate and pack. Also, the forward angle of edge 184 allows a rider's foot to position sideways, overlapping the foot tread assembly 52, and yet stay retained behind foot grip assembly 50.

Figure 13:
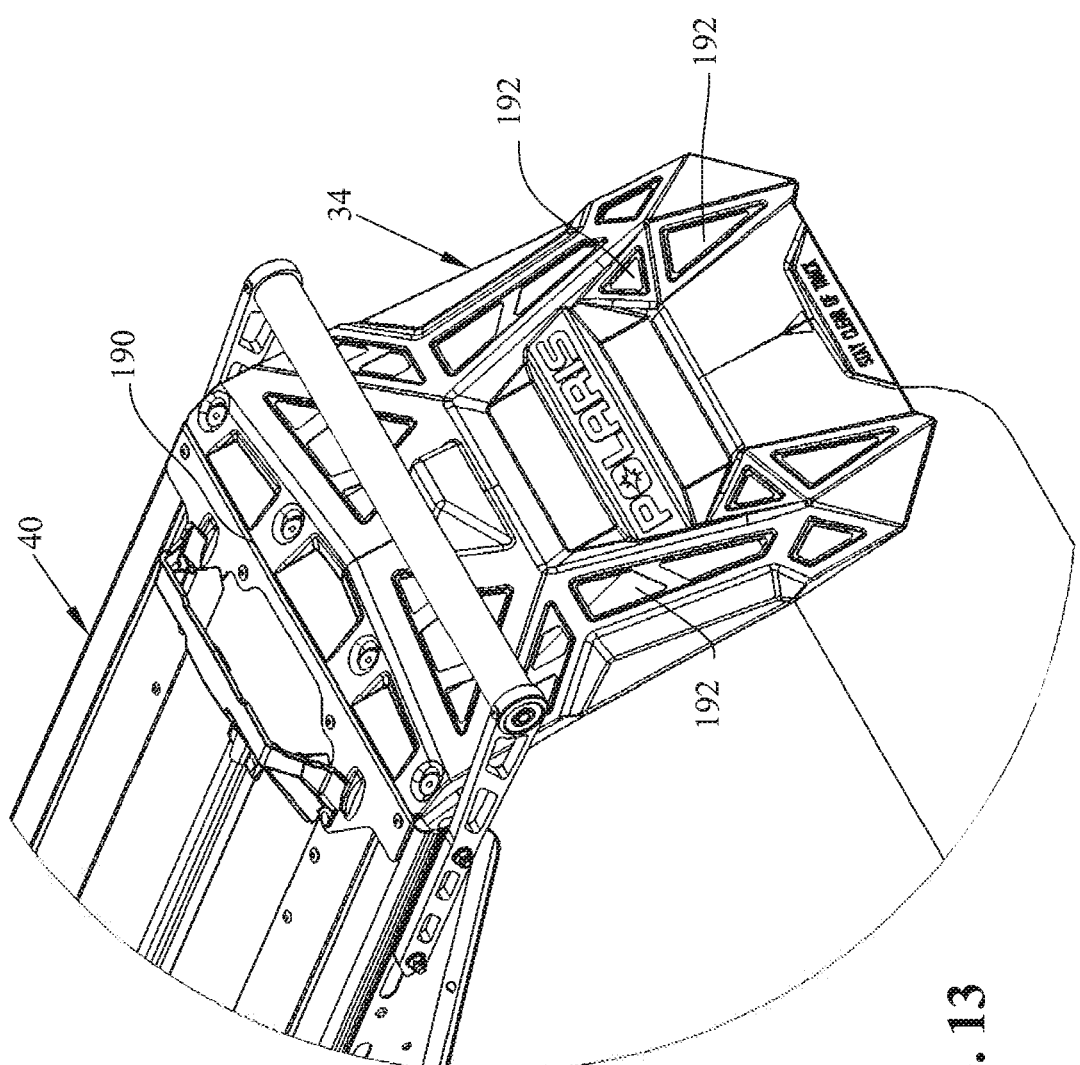
FIG. 13 is an enlarged view of the rear snow flap.

With reference now to FIG. 13, snow flap 34 is shown in an enlarged view. Snow flap 34 is hingedly mounted to the tunnel 40 along a rear edge 190. The snow flap 34 includes a plurality of apertures 192 which reduces the overall weight of the component. These could be machined or molded in.

Figure 14:
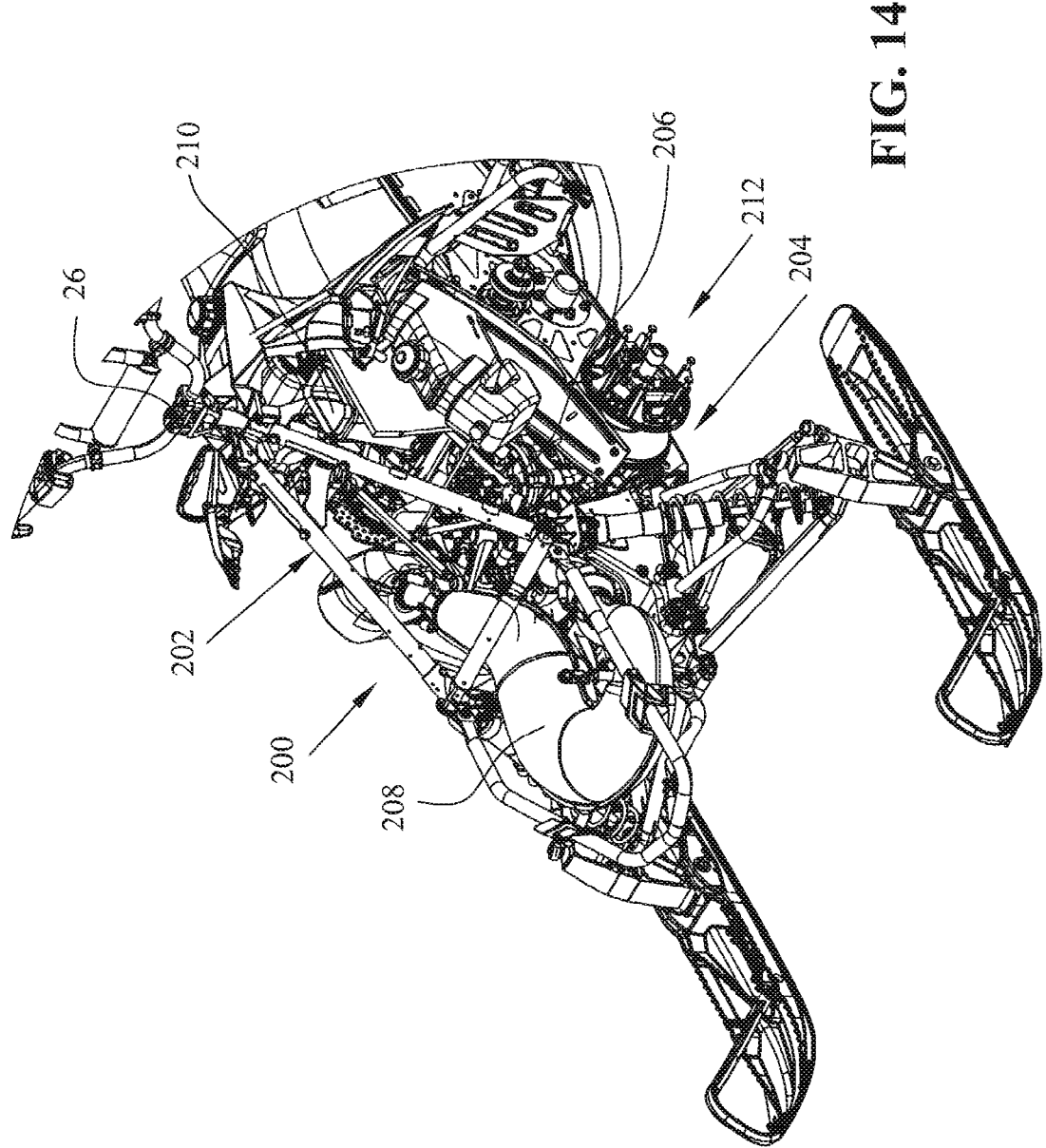
FIG. 14 is a partial front perspective view of the snowmobile with the front body removed.

With reference now to FIG. 14, the outer body 24 has been removed which better exposes the engine compartment 200, the steering assembly 26, the frame front portion 202, and the power train 204. The power train 204 includes an engine 206 having an exhaust system 208, an intake system 210 and a drive system including a CVT 212. As mentioned above, the ventilation area 160 was defined around the foot grip area, and this allows the CVT ventilation to exhaust through ventilation area 160.

Figure 15:
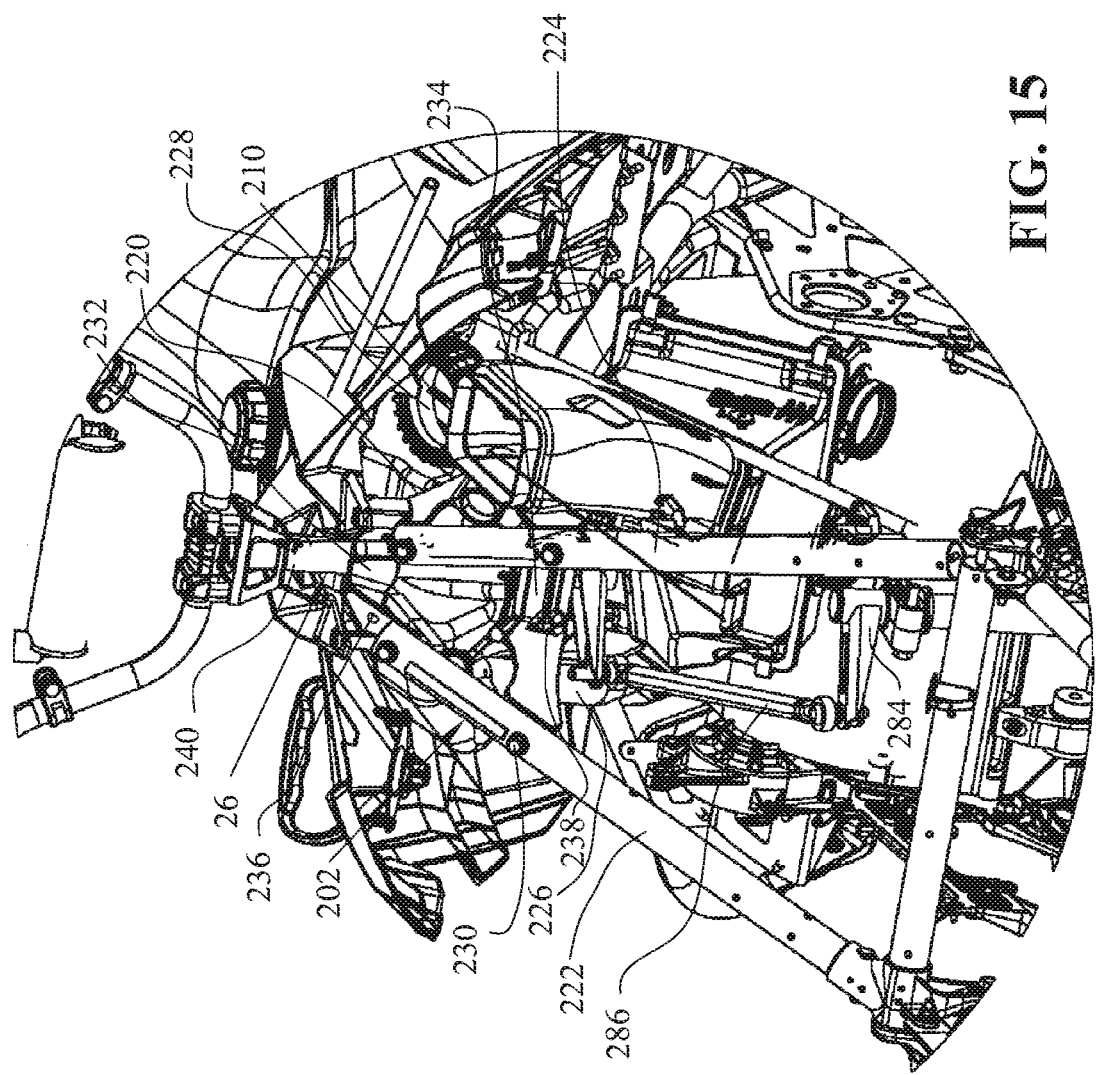
FIG. 15 is an enlarged front perspective of the front frame.

With reference now to FIG. 15, the front portion 202 of the frame is shown in greater detail. Front portion 202 includes a cast coupling or connector 220 configured to attach plural frame tubes, namely front frame tubes 222, 224 and rear frame tubes 226 and 228 thereto. The frame tubes 222, 224, 226, 228 may be attached to the cast coupling 220 by way of fasteners such as 230 and/or may be adhesively fixed to the cast coupling 220. As shown, the cast coupling 220 further includes two support webs 232 and 234. Each of the webs is provided with threaded apertures, for example, 236 and 238. As also shown in FIG. 15, a steering post 260 of steering assembly 26 is directly coupled to webs 232 and 234 of the cast coupling 220, as described herein.

Figure 18:
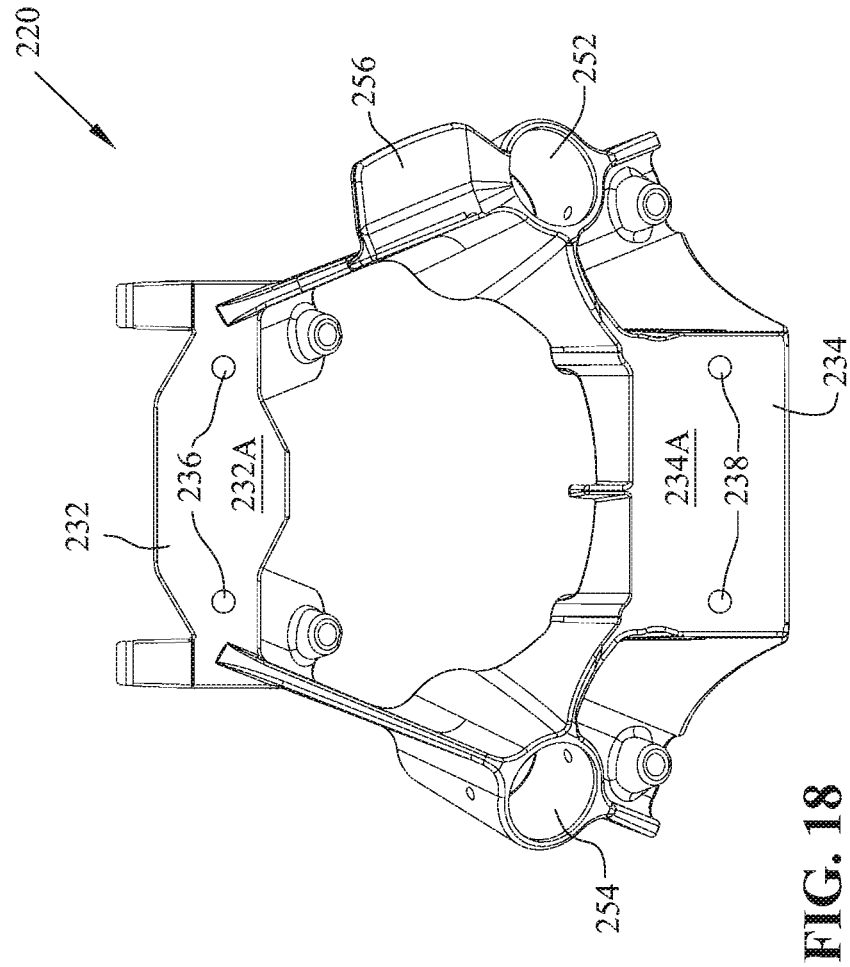
FIG. 18 is a rear view of the cast frame member.

With reference now to FIGS. 16-18, cast coupling 220 will be described in greater detail. Cast coupling 220 further includes a first circular channel (FIG. 16) defined by portions 240 and 242 having threaded bosses 244 extending downwardly therethrough. A second circular channel is defined by portions 246 and 248 having threaded bosses 250 therein. The circular channels are intersected by cylindrical members 252 and 254. Thus, with a comparison of FIGS. 15 and 16, it should be appreciated that frame tubes 222 and 224 are positioned across the circular channels with fasteners such as 230 positioned through the frame tubes 222, 224 and into the threaded bosses 244, 250. Adhesive may also be applied. Meanwhile, frame tubes 226 and 228 are positioned in the cylindrical members 252 and 254, and may also be fixed in place by way of fasteners and adhesive.

With reference now to FIG. 18, cast coupling 220 includes machined mounting surfaces 232A and 234A on the backside of the webs 232 and 234, respectively, for mounting the steering post as described below. Finally as best shown in FIG. 17, cast coupling 220 includes an integral fuel tank mounting tab shown at 258.

Figure 19:
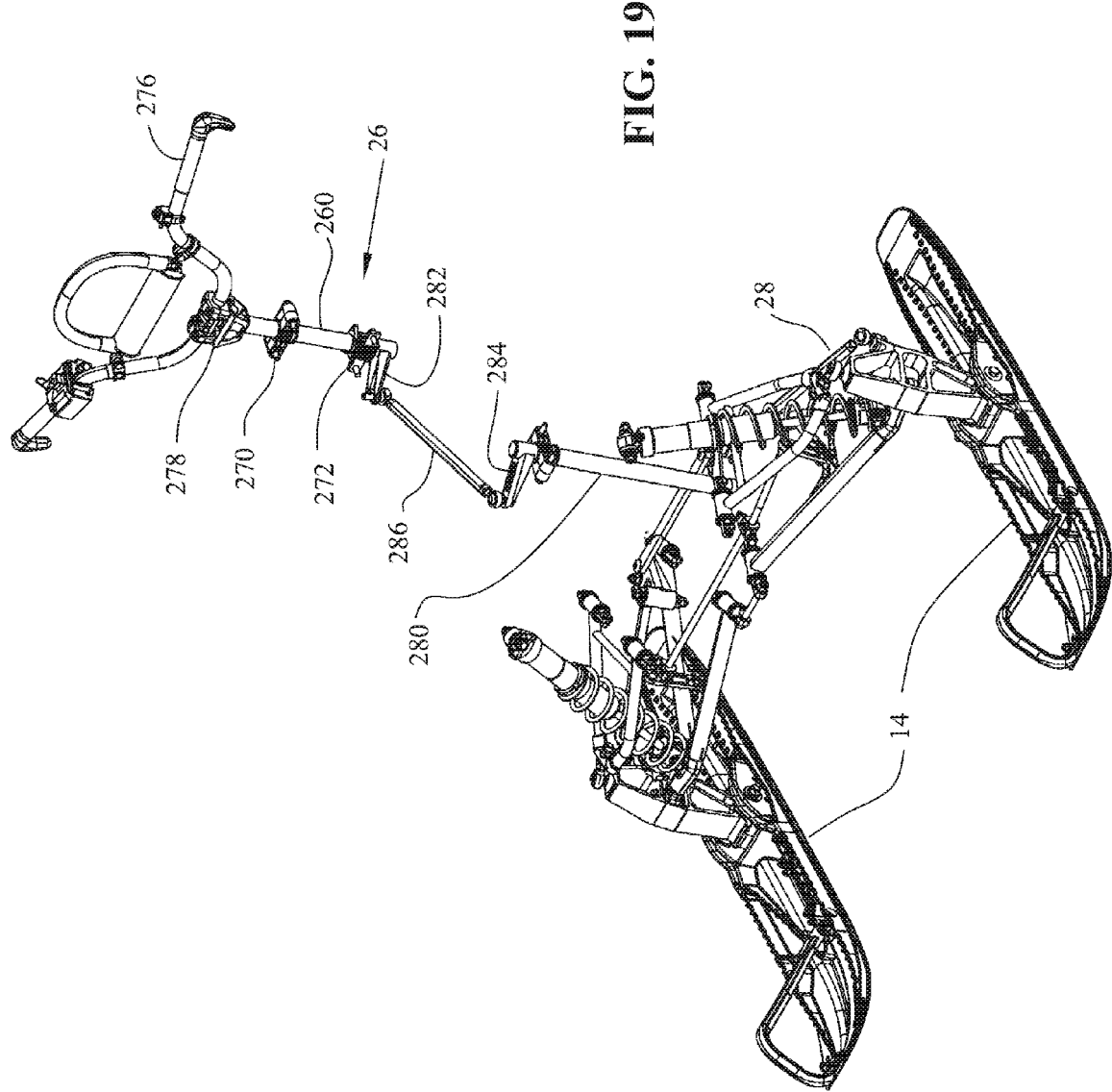
FIG. 19 is a front perspective view of the steering assembly.

With reference now to FIG. 19, the steering assembly is shown in greater detail. As shown, steering post 260 includes an upper and lower bearing posts 270 and 272 which attach to the backside of the webs 232, 234 respectively, with fasteners being attached to threaded apertures 236 and 238, respectively. This rigidly connects the steering post 260 to the cast coupling 220 yet allows the steering post to pivot about the corresponding bushings 270 and 272. As also shown, handlebars 276 of steering assembly 26 are attached to the steering post 260 by way of a clamp at 278.

Steering assembly 26 further comprises a lower steering post 280 which is operatively coupled to steering post 260 by way of respective link arms 282, 284, connected together by way of a link 286. Lower steering post 280 is ultimately connected to steering arms 28 by way of a further steering arm, not shown, to maneuver the steering skis 14.

Figure 20:
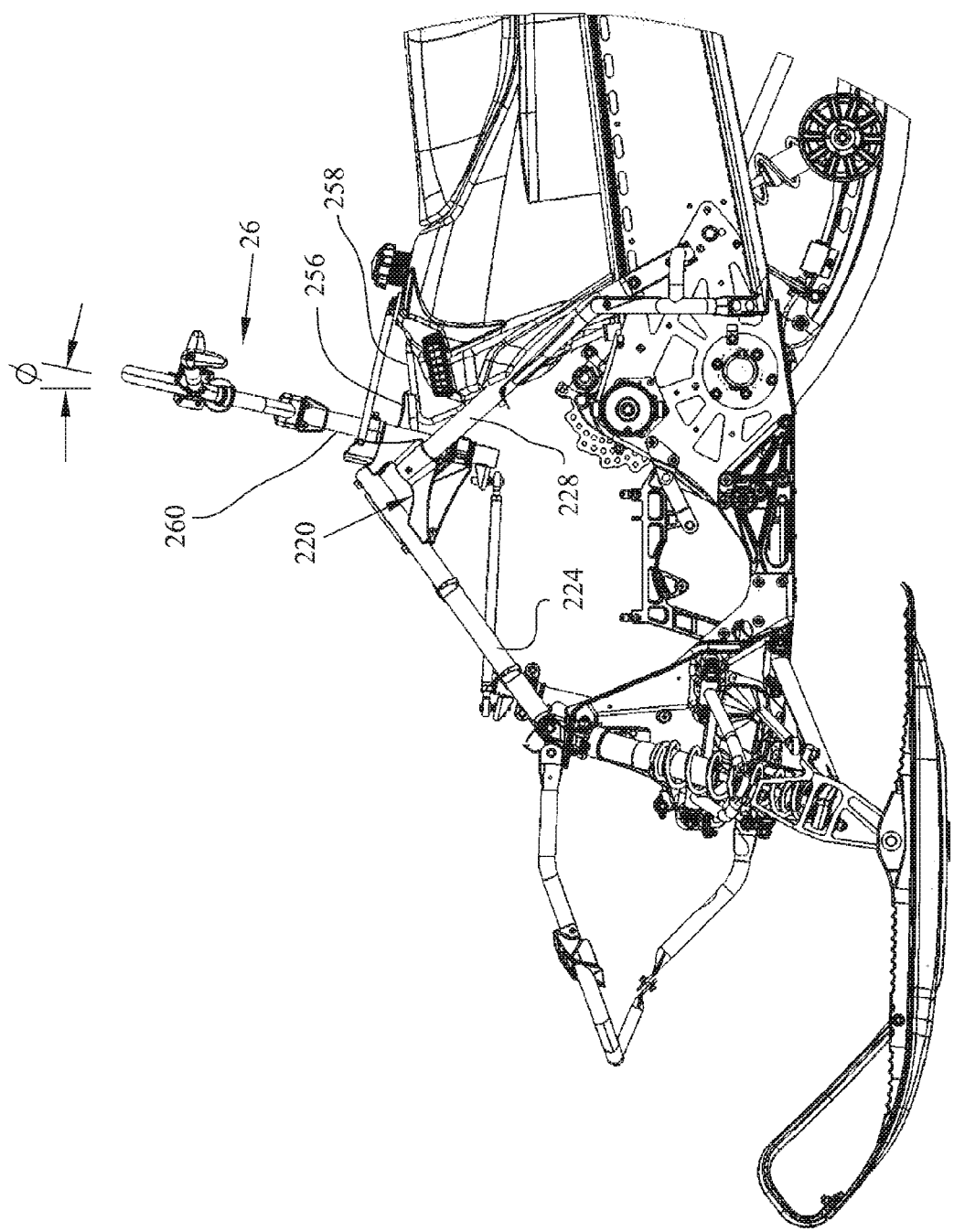
FIG. 20 is a side view of the steering assembly mounted to the cast frame member of FIG. 16.

With reference now to FIG. 20, steering assembly 26 is shown mounted to the backside of cast coupling 220 with the bushings 270, 272 (FIG. 19) mounted to the surfaces 232A, 234A (FIG. 18), respectively. As shown, steering post 260 is nearly vertical and could be in the range where angle θ could be between 0 and 15 degrees and as shown is about 13 degrees. As steering post 260 is positioned at a substantially upright angle, the ergonomics is improved for the deep snow rider.

As known, when side hilling, a rider is often standing on only one side of the running board assemblies 32 and the maneuverability of the steering post and handlebars 276 is substantially increased when the steering post 260 is close to vertical. This prevents the handlebars 276 from dipping down or raising up on either side when attempting to steer the snowmobile while standing on only one side.

FIG. 20 also shows a fuel tank 258 having a front end positioned adjacent to the integral fuel tank mounting tab 256 to retain a front end of the fuel tank 258. Fuel tank 258 may be attached to tab 256 through fasteners, or fuel tank could have a molded slot to be applied over tab 256.

Figure 21:
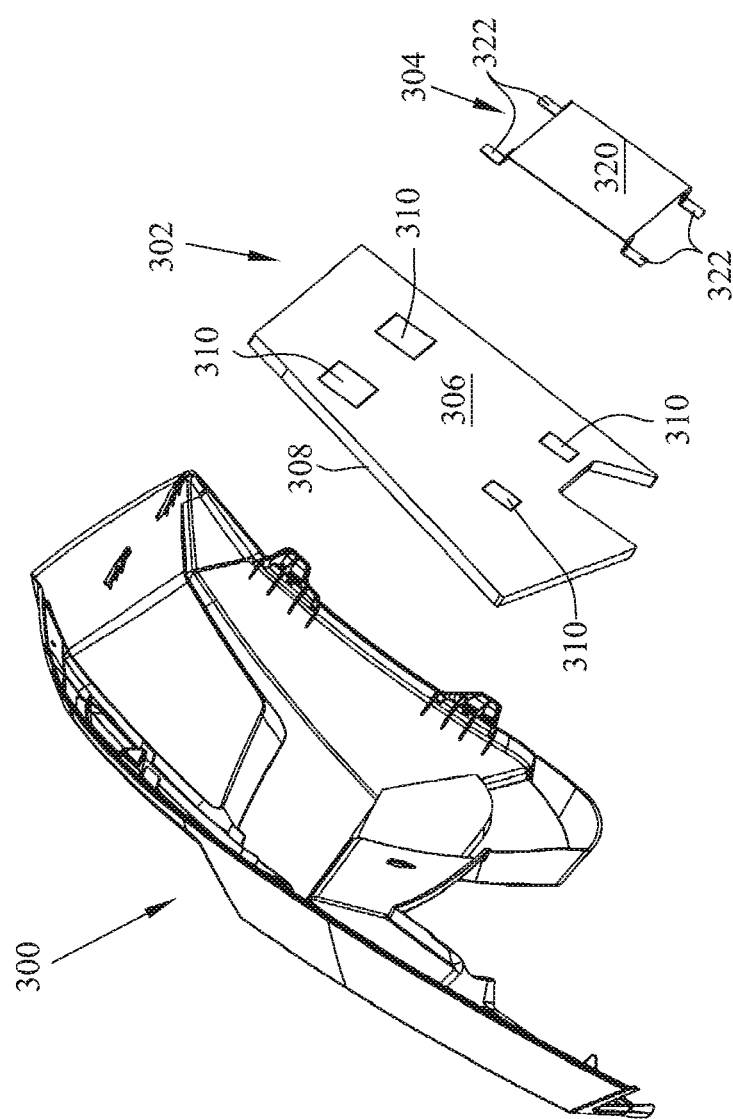
FIG. 21 is a side perspective view of a heat shield member mounted to an inside of the body panel.

With respect now to FIG. 21, front side panel 300 (see also FIG. 4) on the right hand side of the snowmobile is provided with sound insulation 302 as well as a heat shield 304. The foam includes a front surface 306, a back surface 308, and a plurality of cutouts 310 extending between the front and back surface. Heat shield 304 includes a plate 320 having a plurality of mounting feet 322 which correspond in location to the apertures 310. An adhesive is provided against the back surface 308 to retain sound insulation to the inside surface of the panel 300. Heat shield 304 can be placed with the feet 322 aligned with the associated apertures 310 and pressed against the foam 302 until the feet contact the adhesive, through the apertures, which retains the heat shield to the foam member 302. This prevents any fasteners or additional dimensional requirements for attaching the heat shield to the foam. This also provides less weight for the snowmobile yet provides a heat shield 304 adjacent to a portion of the exhaust system of the snowmobile power train as described above. The adhesive could be a double-sided sticky tape, double sided foam tape, or any other adhesive for the purposed described.

Figure 22:
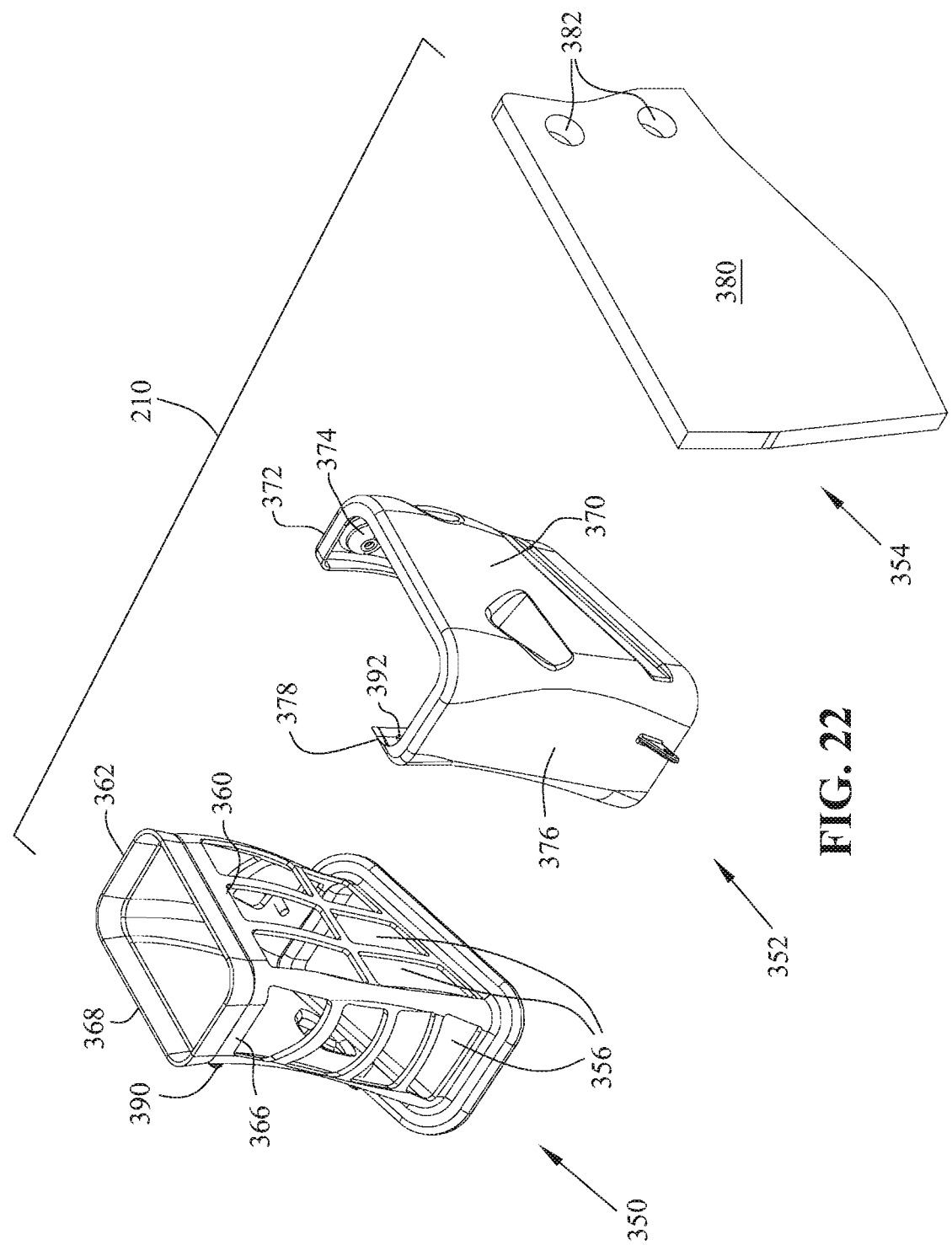
FIG. 22 is an exploded perspective view of the air intake system.

Referring now to FIG. 22, air inlet 210 (FIG. 15) is shown in greater detail as comprised of inlet housing 350, retainer housing 352 and sound-deadening foam 354. Housing 350 is generally rectangular having a plurality of apertures 356 extending therethrough, where the rectangular housing has a front wall 360, sidewall 362 opposite side wall 366 and rear wall 368. Retainer 352 includes a front wall 370, sidewall 372 having lugs 374, opposite sidewall 376 and a partial rear wall 378. Sound-deadening foam 354 generally includes a foam body portion 380 having locating apertures at 382.

It should be appreciated that the foam 354 is positioned on an inside of the retainer member 352 with lugs 374 aligned with apertures 382 of the foam 354. The retainer and foam together are then snapped around housing 350 with the front wall 370 of retainer 352 positioned against front wall 360 of housing 350, sidewalls 372 and 376 positioned adjacent to corresponding sidewalls 362 and 366, respectively, and with partial wall 378 at retainer 352 positioned against back wall 368. The retainer 352 and housing 350 can be held together by way of corresponding latch members such as lug 390 and aperture 392 to retain the two components together. This provides an easy to assemble two component intake system 210 having an internal housing 350 and a retainer housing 352 whereby air traveling through the intake system can be sound-deadened by foam member 354.

Figure 23:
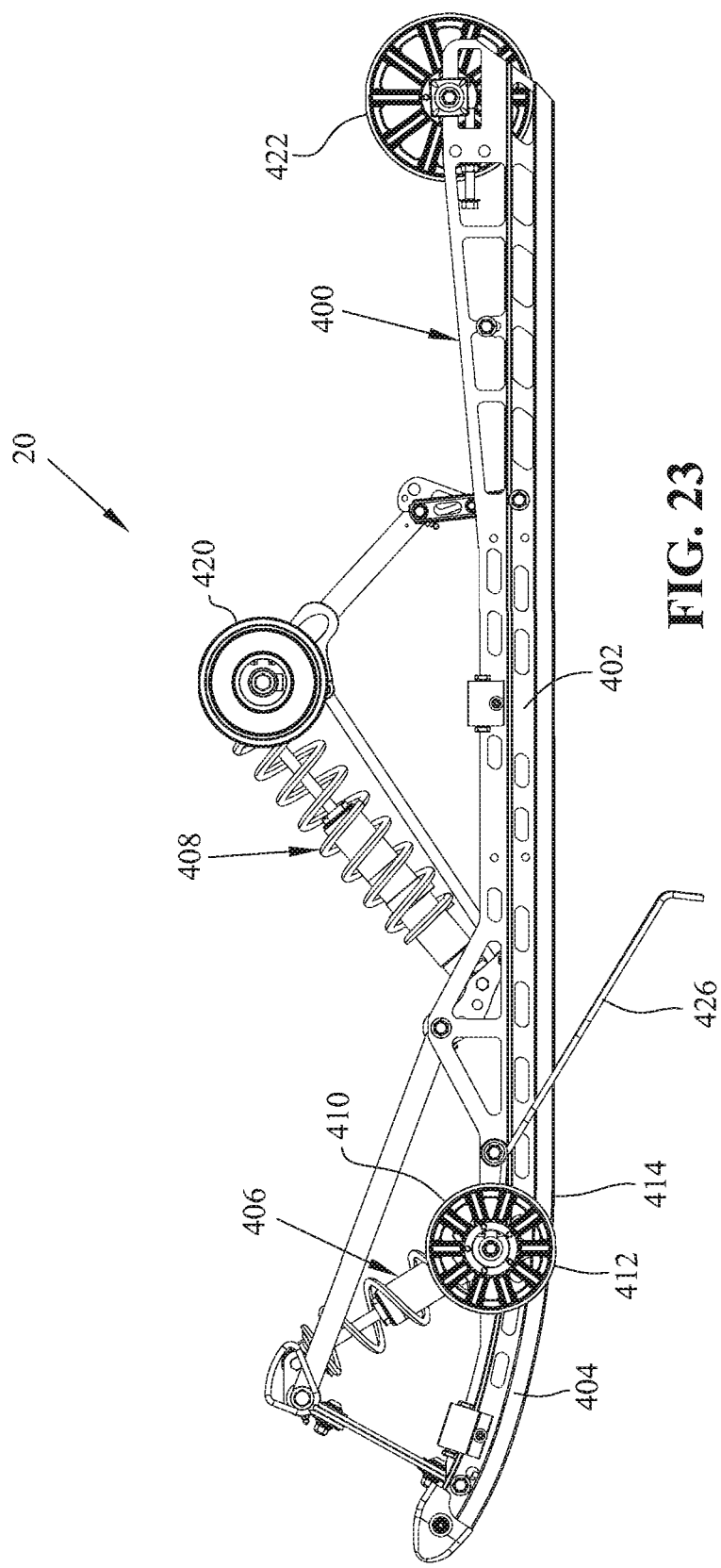
FIG. 23 is a side showing the suspension system removed from the tunnel.

With reference now to FIG. 23, rear suspension 20 is shown removed from the tunnel, understanding that the rear suspension is attached to the underside of tunnel 40. Suspension 20 includes a frame 400 having laterally spaced frame rails 402 with slide rails 404 attached thereto. Suspension 20 includes two coil over shocks 406 and 408 providing dampening between the tunnel 40 and frame 400. A track roller 410 is mounted on the outside of the slide rail 402, and as shown, has an outer radial surface 412 which extends beyond lower surface 414 of slider 404. Track rollers 410 are located at a position proximate a maximum pressure point between the sliders 404 and track (absent the track wheel) which allows the track a slight spacing between the sliders 404 preventing substantial frictional heating. Suspension 20 also includes idler rollers 420 and 422. Scratchers 426 are also provided on the side of frame 404 to break up crusted snow in order that the track can throw snow against the underside of tunnel 40, as the tunnel includes a heat exchanger for engine water.

Figure 24:
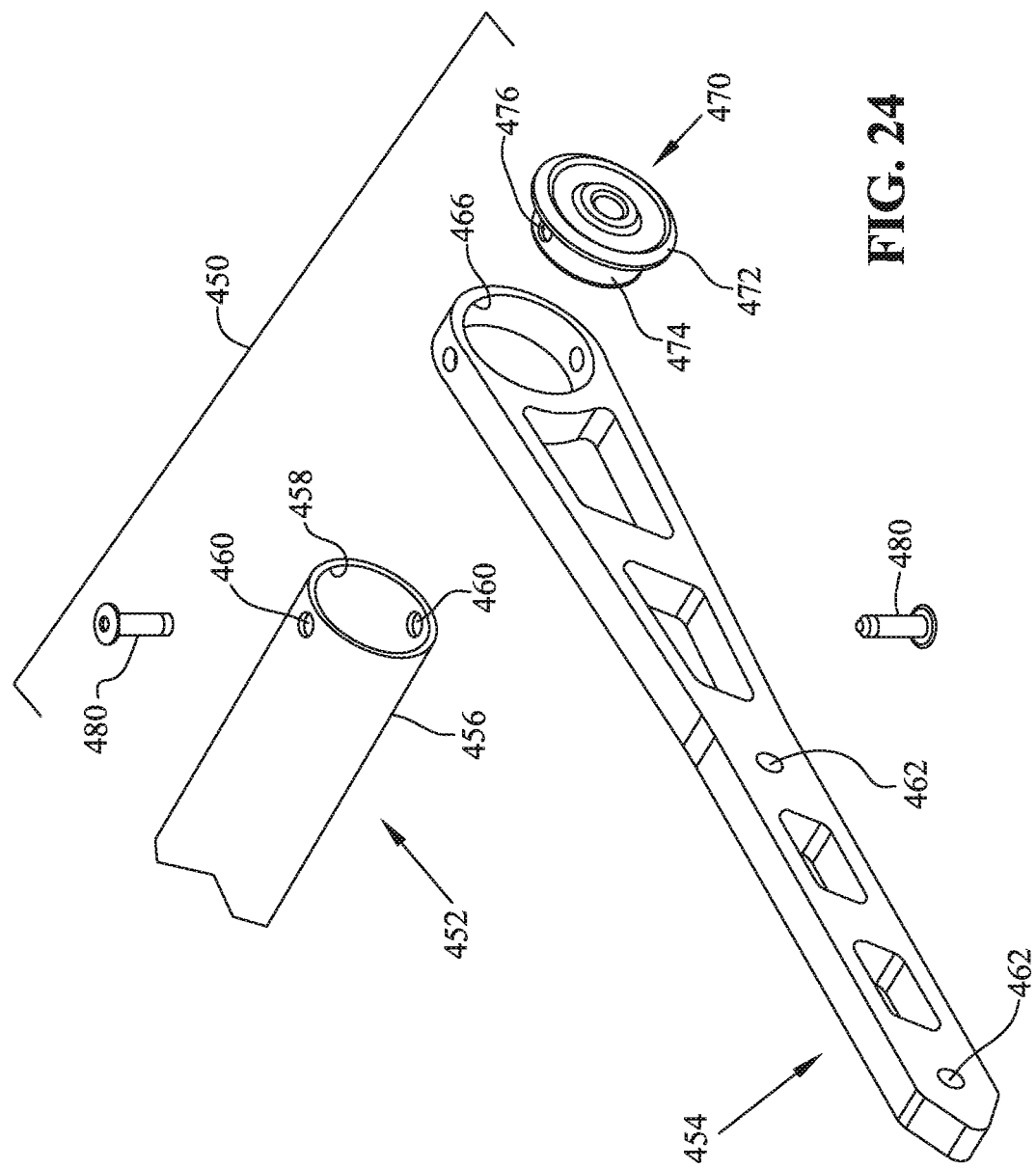
FIG. 24 shows an exploded view of a rear bumper.

With reference now to FIGS. 13 and 24, a rear bumper assembly 450 is shown including a rear bumper member 452 and side brackets 454. Bumper member 452 is comprised of a carbon fiber material and as best shown in FIG. 24 has an outer diameter 456, an inner diameter 458, and apertures 460. Side brackets 454 are comprised of an extruded aluminum and include apertures 462 for mounting the side brackets to tunnel 40 by way of fasteners 464 (FIG. 13). As shown, extruded brackets 454 have extruded openings at 466 and apertures 468 which extend into openings 466. A cap 470 is also provided having a lip 472, and a reduced diameter portion 474 having apertures 476.

To assemble bumper assembly 450, bumper member 452 is positioned in openings 466 of extruded members 454. Caps 470 are positioned with diameter portions 474 within inner diameter 458 and with the lips 472 against the extruded side bracket 454, with apertures 460 and 476 aligned.

Fasteners 480 are then placed through the extruded members 454, bumper member 452 and cap 470 to retain the bumper member thereto. Fasteners 464 could be set screws, bolts, rivets or any similar fastening device, although as shown, fasteners 480 are rivets. As also shown in FIG. 13, snow flap 34 includes a stop member 490 integrally molded with the flap which has an upper stop surface 492 which abuts against the bumper member 452.

It should be generally understood that the description provided herein relates only to the specific embodiment, and that other variations could be envisions. For example, while referring herein to tubes, cylindrical tubes are shown, but it is contemplated that other structural geometries, such rectangular or square tubes could also be used.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A frame for a snowmobile comprising:
   a plurality of frame members; and
   a coupling to receive the plurality of frame members, the coupling includes a first open channel and a second open channel and at least one cylindrical member for receiving the plurality of frame members, the coupling being operatively coupled to a lower portion of a steering post of a steering assembly, wherein a forward-most end of the at least one cylindrical member of the coupling is positioned forward of a forward-most end of the lower portion of the steering post, and the steering assembly is mounted to the coupling at a substantially upright angle.

2. The frame of claim 1, wherein the steering assembly includes the steering post operatively coupled to at least one web of the coupling.

3. The frame of claim 2, wherein the steering assembly is coupled to the coupling at an angle between 0-15 degrees.

4. The frame of claim 1, wherein the coupling includes a tab for mounting a fuel tank to the coupling.

5. The frame of claim 4, wherein the tab is integral with the coupling.

6. The frame of claim 1, wherein each of the frame members is attached to the coupling with at least one of adhesive and fasteners.

7. The frame of claim 1, wherein at least a portion of one of the first and second open channels is vertically aligned with a portion of the at least one cylindrical member.

8. A connector for a snowmobile comprising:
   a coupling member having a frame portion for securing a plurality of frame members thereto and a steering portion for coupling a steering assembly thereto, the frame portion including a first channel, a second channel, a first cylindrical member, and a second cylindrical member for receiving the plurality of frame members, the first channel including an upper portion having a first upper-most surface and a lower portion, and the second channel including an upper portion having a second upper-most surface and a lower portion; and
   the steering portion including a first web and a second web for receiving a steering post of a steering assembly, the first web including an upper-most surface directly coupled to the first upper-most surface of the first channel and the second upper-most surface of the second channel such that the upper-most surfaces of the first web, the first channel, and the second channel define a continuous outer surface of the upper portion of the coupling member, and the second web extending between the lower portion of the first channel and the lower portion of the second channel.

9. The connector of claim 8, wherein a first axis of the first channel is intersected by a first axis of the first cylindrical member and a second axis of the second channel is intersected by a second axis of the second cylindrical member.

10. The connector of claim 8, wherein the steering post is operatively coupled to a back face of the first web and a back face of the second web between 0-15 degrees.

11. The connector of claim 8, further comprising a tab for mounting a fuel tank to the connector.

12. The connector of claim 8, wherein the first web is vertically aligned with rearwards ends of the first and second cylindrical members.

* * * * *